Jan. 1, 1946.   M. J. ZALESKE   2,392,210
HOSE CLAMP
Filed July 18, 1944
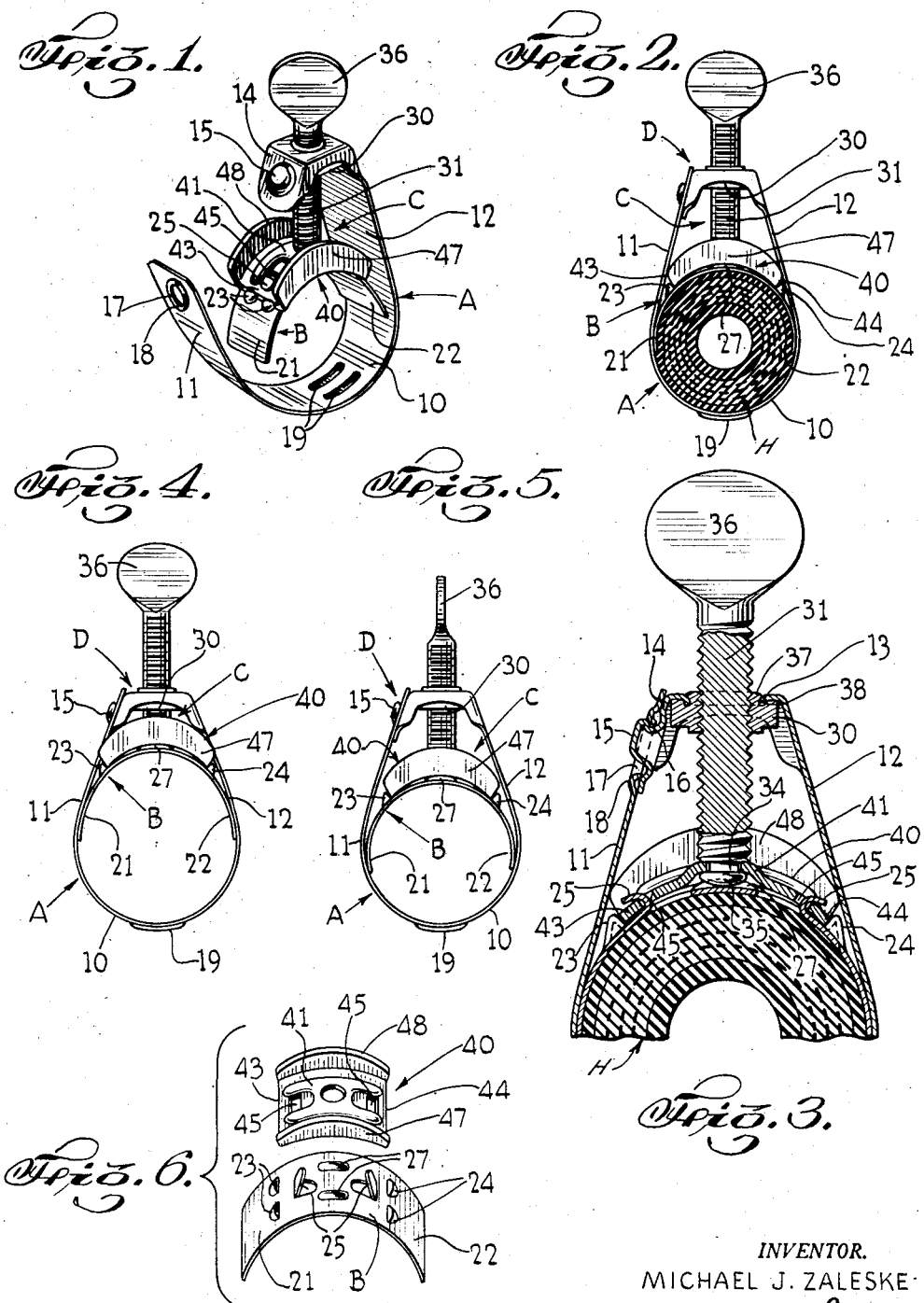
INVENTOR.
MICHAEL J. ZALESKE
BY Hammond & Littell
ATTORNEYS Patented Jan. 1, 1946

2,392,210

UNITED STATES PATENT OFFICE 2,392,210

HOSE CLAMP

Michael J. Zaleske, Union, N. J., assignor to Ideal Clamp Manufacturing Co., Inc., Brooklyn, N. Y., a corporation of New York Application July 18, 1944, Serial No. 545,423

16 Claims. (Cl. 24—19)

This invention relates to hose clamps.

One of the objects of my invention is to provide hose clamps which have a large extent of take-up, or adaptability to hose of varying size, and yet will clamp hose of various sizes so securely and in such close conformity to the curvature of the hose as to avoid the presence of open zones or pockets of ineffectual clamping action.

Another object of my invention is to provide hose clamps using bands of flexible metal to clamp the hose which are constructed so that the clamps can be applied readily over hose in position, yet so that the metal bands are not weakened materially by joints or cutout portions.

Another object is to provide hose clamps of strong and durable construction which can be applied quickly over hose in position and engaged for tightening operations by a simple manipulation.

A further object of my invention is to provide hose clamps of strong construction which are protected against being deformed objectionably by careless handling when being applied or clamped to or when being removed from a hose.

Still another object is to provide hose clamps which possess an optimum combination of strength, adjustability and adaptability to hose of various sizes, uniform circular clamping action, simplicity of application and operation, and economy of construction. Thus, I provide hose clamps which are valuable for uses, such as in aircraft and the like, where this combination of characteristics is especially desirable.

The foregoing and other objectives, features and advantages of my invention will become apparent from the following detailed description of an illustrative embodiment thereof, while the new features of combination, construction, and operation which I claim as my invention are set forth more particularly in the appended claims. The detailed description refers to the accompanying drawing which forms part hereof and in which:

Figure 1 is a perspective view of the illustrative embodiment;

Figure 2 is a side view of the clamp as applied and clamped to a hose;

Figure 3 is an enlarged vertical section through part of the assembly of Figure 2, showing certain details of construction;

Figure 4 is a side view of the clamp with the parts disposed to fit a hose of relatively large diameter;

Figure 5 is a side view of the same clamp with the parts disposed to fit a hose of relatively small diameter; and Figure 6 is an exploded perspective view of the flexible saddle element and pusher element of the illustrated embodiment.

As appears from the drawing, the illustrated clamp comprises three main operating elements in combination. These include a flexible metal band A formed into a loop, a flexible metal saddle B having an arcuate form to engage a hose and facing the curve or loop of band A, together with operating means C, which include a rigid pusher 40 and a screw 31 which work between the saddle B and a junction of the loop extremities disposed at D behind the saddle, so as to pull the loop and push the saddle into tight clamping engagement with a hose located between the saddle and the loop.

Band A and the saddle B are each made of sheet metal sufficiently strong to withstand the stresses to be encountered in the use of the clamp, yet sufficiently flexible to bend under clamping stresses and conform to the curvature of a hose located between these elements. Each of elements A and B may be described as a substantially semi-circular flexible strap member. When the clamp is engaged and ready to be operated, the two semi-circular members—B and portion 10 of A, respectively—face oppositely to each other, and the end portions 21, 22 of the saddle element B are disposed inside of and lie against the legs 11 and 12 of the loop or band element, as appears in Figures 2 to 5 of the drawing. Upon actuating the operating means C to converge the saddle and the loop, these two members are forced together in such a manner that they telescope relatively to each other and at the same time flex and change in curvature so as to conform substantially to the curvature of the hose clamped therebetween.

As shown in the drawing, the band A is a substantially unbroken metal strap comprising a semi-circular loop portion 10 having legs 11 and 12 to be retained together at junction D (Figure 2). The junction lies at a side of the hose opposite the side engaged by the loop 10. A threaded member such as a nut 30 is held to one or both of the band end portions at their junction.

The saddle B is a flexible metal strap of arcuate, substantially semi-circular form, preferably having a normal curvature approximating that of the largest hose for which the clamp is adapted. Its end portions 21 and 22 lie inside and against the legs 11 and 12 of the band when the clamp is assembled, as shown in Figures 2 to 5. In that condition of the clamp the band and the saddle together define a substantially circular structure of variable radius capable of being telescoped, flexed and clamped against a hose therewithin by manipulation of the operating means C.

The operating means as shown include the nut 30, a screw 31 threaded through the nut so as to move radially with respect to loop 10 and a hose H therewithin, and a pusher 40 adapted to operate the saddle. The pusher is rigid. It has an arched form, so as to provide pushing feet 43 and 44 for cooperation with protuberances 23 and 24 on the saddle B, and so as to remain free from bearing contact against the saddle except at these feet. In other words, the pusher is formed so that the portion thereof between its ends or feet 43 and 44 never reaches a point of tangency to the saddle clamping a hose, unless in the case of the smallest hose for which the clamp is designed. The pusher is connected for linear movement with the screw 31, such as by means of an embossed central portion 41 (Figure 3) which loosely surrounds a reduced portion 34 at the end of the screw and is retained there by a head 35 on the screw. A thumbpiece 36 is provided at the outer end of screw 31 for tightening or untightening the clamp.

The feet 43 and 44 of the pusher 40 are disposed to engage and push the opposite sides or legs 21 and 22 of the saddle B. To cooperate with these feet the saddle may be formed on its back or convex face with struck-up stops or protuberances 23 and 24, respectively, disposed on opposite sides of its midportion at 27. These stops have radially extended faces which provide a sure bearing surface for the feet 43 and 44 during clamping operations, whether the clamp be fully open or be operated to its smallest radius of curvature.

In addition, the saddle B preferably is connected for retraction or unclamping movements with the operating means, such as by means of struck-up lugs 25 which pass through slots 45 in and overhang the upper face of the pusher. These lugs need not hold the parts firmly together, but should allow a certain freedom of movement whereby the feet 43 and 44 may find their proper position with respect to the faces of protuberances 23 and 24 in any condition of operation of the clamp.

It will be understood that the feet 43 and 44 bear against the protuberances 23 and 24, respectively, as the screw 31 is turned to converge and telescope elements A and B against a hose. When the screw is turned to tighten the clamp, its threads work in the nut 30 at junction D, where the extremities of the band A are secured, while its inner end adjacent to 34 thrusts against the pusher 40, which in turn bears against the back or convex face of the saddle B through feet 43 and 44 of the pusher and protuberances 23 and 24 on the opposite sides of the saddle, thus thrusting the saddle ends toward the apex of the band loop. In other words, the loop 10 is pulled against one side of the hose while the flexible saddle B is pushed with equal force against the other side of the hose, and the thrust of the pusher feet against the protuberances of the saddle causes the end portions 21 and 22 of the latter to slide along and telescope with the inner sides of the loop 10. At the same time, the saddle as well as the loop 10 bends or changes in curvature so that the clamp becomes tightened against the hose H over the entire circumference and in substantial conformity to the curvature of the hose, without leaving open spaces or pockets where the clamping action would be ineffectual.

The saddle B can be made with reinforcing means, such as embossed ribs 27, across its midportion so as to avoid deformation in that zone under clamping stresses. These ribs desirably are formed with a radius of curvature approximating that of the smallest hose for which the clamp is adapted.

The pusher 40 preferably is formed with upstanding flanges 47 and 48 along its sides to provide a channel structure which embraces the legs 11 and 12, respectively, of the band A when the clamp is assembled and untightened, as shown in Figure 4. This structure maintains the saddle element in proper position with respect to the loop 10.

Further features of my invention reside in the manner of securing the extremities of the band A at junction D and in the provision of a separable connection for one extremity of the band which permits the clamp readily to be engaged over or disengaged from a hose in position by simple hand movements.

The end portion of leg 12, for example, is permanently connected with nut 30, as follows (Figure 3): The upper face of the nut is formed initially with an upstanding circular flange 37 and a surrounding circular groove 38. The band is perforated to fit over flange 37 and is formed with a downturned circular flange 13 which surrounds the perforation and fits into the groove 38. The nut flange 37 is then turned or forged outwardly over the flange 13 so as to confine and hold the latter securely against all stresses that may be encountered in the use of the clamp.

The other band leg 11 might be connected similarly to nut 30, but preferably is provided with a separable connection, as follows: Leg 12 is formed with an extension 14 projecting beyond nut 30, and this extension is pressed and deformed so as to provide a button or hook-like element 15 having an upwardly facing groove 16 at its upper inside marign. The end portion of leg 11 then is formed with an eye 17 to engage over this button 15 and be retained in the groove 16. The eye 17 preferably is reinforced around its circumference, for example, by a circular embossment 18, so that the band will not tear in the region of the eye under clamping stresses.

By the use of the construction just described, the clamp can be quickly engaged over or disengaged from a hose in position, through simple hand operations. Figure 1 shows the clamp in disengaged or open condition. The free leg 11 of band A may be pulled downward to provide space for entrance of a hose between saddle B and loop 10, whereupon the free leg 11 may be moved toward button 15 by the thumb, and may be connected with the other leg 12 simply by pushing eye 17 over the upper edge of the button 15. The upper margin of the eye thereupon becomes engaged by snapping into groove 16, and it remains engaged under clamping stresses. It may be easily disengaged, however, by pushing upwardly on leg 11 with the thumb when the screw 31 has been turned so as to loosen the clamp.

Figures 4 and 5 of the drawing illustrate the adaptability of the clamps herein disclosed to hose of various sizes. In Figure 4 the clamping elements are relatively open so as to define a substantially circular structure or cavity of relatively large radius. In Figure 5 the elements are converged or telescoped closer together so as to define a substantially circular structure or cavity of relatively small radius. In either of these conditions, whether applied to a relatively large or a relatively small hose, the flexible saddle and loop elements can be clamped tightly around the entire circumference of the hose in substantial conformity to its curvature, as appears from Figures 2 and 3 of the drawing.

A further feature of construction resides in the provision of reinforcements, such as embossed ribs 19, across the apex or midportion of the loop 16 in band A, to resist undue deformation of the band in the event of careless handling of the clamp by a workman applying it to or removing it from a hose.

While I have illustrated and described in detail a preferred embodiment of my invention, it will be apparent that the new features of construction and combination herein set forth may be embodied in other forms of hose clamps, and I therefore desire that the invention be accorded a scope fully commensurate with its contributions to the art, which are intended to be defined by the appended claims.

I claim:

1. In a hose clamp, a band in the form of a loop, an arcuate flexible saddle of changeable curvature disposed between the sides of said loop to define with the loop an approximately circular structure of variable radius, the sides of said loop extending to a junction beyond said circular structure and means including a rigid pusher member to bear against said saddle and a screw working between said junction and said pusher member for simultaneously forcing said saddle and said loop in opposite directions so as to converge, flex and clamp the same against a hose within said structure in substantial conformity to the curvature of any of a variety of sizes of hose for which the clamp is adapted.

2. In a hose clamp, a flexible metal band in the form of a loop, means including a threaded member for holding together the extremities of said loop, an arcuate flexible metal saddle disposed between the sides of said loop so that the end portions of said saddle will lie thereagainst, said saddle defining with said loop an approximately circular structure to surround a hose, and means including a screw cooperating with said threaded member and a rigid pusher actuated by said screw and bearing against said saddle for pushing said saddle and pulling said loop against a hose therewithin so that the end portions of said saddle telescope along said sides and the saddle and loop flex to conform substantially to the curvature of the hose.

3. In a hose clamp, oppositely facing flexible semi-circular strap members, one disposed inside the other and the other having legs to extend to a junction behind the one member, and means including a rigid pusher to bear against said one member and a screw operative between said junction and said pusher for forcing the two members relatively in opposite directions so as to telescope, flex and clamp them tightly against a hose therebetween in substantial conformity to the curvature of the hose.

4. A hose clamp as described in claim 3 wherein said one member has abutments extended from the convex face thereof on opposite sides of its midportion and said pusher is an arched element the ends of which provide rigid feet to work against said abutments.

5. In a hose clamp as described in claim 3, said one member having abutments extended from the convex face thereof on opposite sides of its midportion, said pusher having rigid feet to work against said abutments, and means interconnecting said one member and said pusher to maintain said feet adjacent said abutments while permitting limited relative motion therebetween.

6. In a hose clamp, oppositely facing flexible semi-circular strap members, one disposed inside the other and the other having legs to extend to a junction behind the one member, and means operative between said junction and the convex face of said one member for forcing the two members relatively in opposite directions so as to telescope, flex and clamp them tightly against a hose therebetween in substantial conformity to the curvature of the hose, said one member having abutments on opposite sides of its midportion and said forcing means comprising a rigid arched pusher disposed between said extended legs and spanning said midportion so as to bear at its ends against said abutments.

7. A hose clamp as described in claim 6 wherein said pusher has an arcuate shape with a radius of curvature smaller than the normal radius of curvature of said one member between said abutments.

8. A hose clamp as described in claim 6 wherein said pusher has upstanding flanges along its sides to form a channel embracing said legs when the clamp is assembled and fully untightened.

9. A hose clamp as described in claim 6 wherein said forcing means also comprise a nut secured to at least one of said legs at said junction and a screw threaded through said nut and bearing at one end on said pusher.

10. In a hose clamp comprising a flexible metal strap in the form of a loop, a tightening nut, said loop having legs to extend to a junction adjacent said nut, an arcuate clamping member disposed between said legs so as to face the curve of said loop and a tightening screw threaded through said nut to thrust said clamping member against a hose while the nut pulls said loop thereagainst, a permanent connection between one end portion of said strap and said nut at said junction and a snap connection for the other end portion of said strap thereat which is quickly engageable or separable by thumb when the clamp is untightened, said strap being substantially continuous and imperforate between said ends.

11. In a hose clamp comprising a flexible metal strap in the form of a loop, a tightening nut, said loop having legs to extend to a junction adjacent said nut, an arcuate clamping member disposed between said legs so as to face the curve of said loop and a tightening screw threaded through said nut to force said clamping member against a hose while the nut pulls said loop thereagainst, a permanent connection for one end portion of said strap at said junction comprsing interfitting and clinched circular flanges respectively on said one end portion and said nut surrounding the screw hole of said nut, and a separable connection for the other end portion of said strap at said junction comprising an eye in said other end portion reinforced around its margin and a button to be engaged by said eye to retain said other end portion against tightening stresses, said button being an integral protuberance from a part of said one end portion extended beyond said permanent connection.

12. A clamping unit for a hose clamp comprising a substantially semi-circular flexible metal strap having at its convex face abutments disposed on opposite sides of its midportion and a rigid arched pusher connected with said strap at its convex face so as to span the midportion thereof and having feet to engage and push against the respective abutments.

13. A clamping unit as described in claim 12 wherein said strap has a rigid embossed section across its midportion so as to flex only on opposite sides thereof, and wherein said abutments extend radially from its opposite sides to be engaged by the respective ends of said pusher.

14. In a hose clamp comprising a flexible metal strap in the form of a loop, a tightening nut, said loop having legs to extend to a junction adjacent said nut, an arcuate clamping member disposed between said legs so as to face the curve of said loop and a tightening screw threaded through said nut to thrust said clamping member against a hose while the nut pulls said loop thereagainst, a permanent connection between one end portion of said strap and said nut at said junction and a connection for the other end portion of said strap thereat which is quickly separable when the clamp is untightened, said strap being substantialy continuous and imperforate between said ends, said permanent connection comprising interfitting and clenched circular flanges respectively on said one end portion and said nut surrounding the screw hole of said nut.

15. In a hose clamp comprising a flexible metal strap in the form of a loop, a tightening nut, said loop having legs to extend to a junction adjacent said nut, an arcuate clamping member disposed between said legs so as to face the curve of said loop and a tightening screw threaded through said nut to thrust said clamping member against a hose while the nut pulls said loop thereagainst, a permanent connection between one end portion of said strap and said nut at said junction and a connection for the other end portion of said strap thereat which is quickly separable when the clamp is untightened, said strap being substantially continuous and imperforate between said ends, said separable connection comprising an eye in said other end portion reinforced around its margin to preserve substantially the full strength of said strap and a button at said junction formed to be engaged by said eye to retain the same against clamping stresses.

16. In a hose clamp comprising a flexible metal strap in the form of a loop, a tightening nut, said loop having legs to extend to a junction adjacent said nut, an arcuate clamping member disposed between said legs so as to face the curve of said loop and a tightening screw threaded through said nut to thrust said clamping member against a hose while the nut pulls said loop thereagainst, the end of one of said strap legs having a portion overlapping a face of said nut and a portion extended therebeyond, said overlapping portion being permanently secured to said nut and having a perforation surrounding said screw, and a quickly separable snap connection at said junction between said extended portion and the end of the other strap leg comprising button means and reinforced eye means respectively thereon, whereby the clamp can be quickly engaged over or disengaged from hose in position by simple hand movements.

MICHAEL J. ZALESKE.